No. 804,015. PATENTED NOV. 7, 1905.
O. F. LANDBERG.
COMBINED JACK AND TRUCK.
APPLICATION FILED JUNE 15, 1905.

UNITED STATES PATENT OFFICE.

OSCAR F. LANDBERG, OF CALMAR, IOWA.

COMBINED JACK AND TRUCK.

No. 804,015.  Specification of Letters Patent.  Patented Nov. 7, 1905.

Application filed June 15, 1905. Serial No. 265,454.

*To all whom it may concern:*

Be it known that I, OSCAR F. LANDBERG, a citizen of the United States, residing at Calmar, in the county of Winneshiek and State of Iowa, have invented certain new and useful Improvements in a Combined Jack and Truck, of which the following is a specification.

My invention relates to improvements in a combined jack and truck, and refers particularly to a jack and truck specially adapted for use in removing and replacing car-wheels; and one object of my invention is the provision of a device for the purpose stated by means of which car and engine wheels may easily be removed and replaced with a great saving of manual labor, time, and expense.

Another object of my invention is the provision of a jack and truck which is simply and strongly made, which is comparatively light, and which may be handled with ease and efficiency.

With these objects in view my invention consists of a pair of rollers, a platform secured between said rollers, and a lifting jack or screw mounted on said platform; and my invention further consists of certain novel features of construction and combination of parts substantially as disclosed herein.

Figure 1:
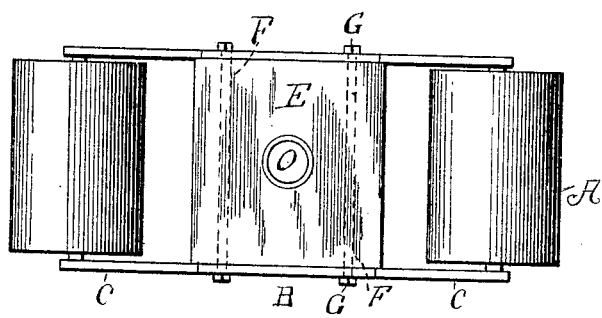
Figure 2:
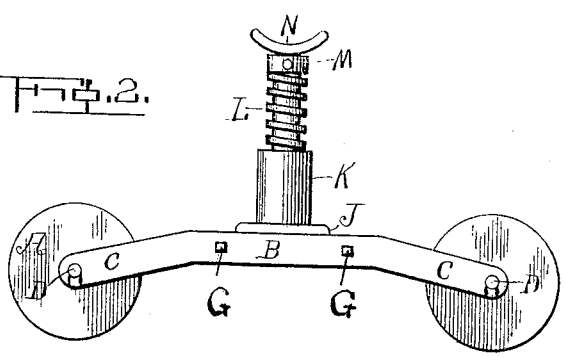
Figure 3:
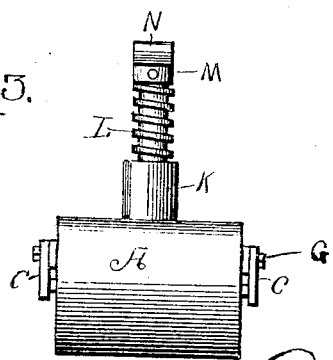

Figure 1 is a bottom plan view of my combined jack and truck. Fig. 2 is a side elevation of the same, and Fig. 3 is a front elevation of the invention.

With reference to the drawings, the letter A designates the wheels of the truck, which are in the form of rollers, so that they are adaptable for service on any kind of surface. The rollers are mounted in the frame B, formed with the downwardly-inclined extensions C, in the ends of which the shafts D are secured, upon which the rollers are adapted to rotate. As will be noted, this construction makes the frame of a truss-like form, and thereby gives greater strength and carrying capacity to the truck. Centrally mounted in the frame is the rectangular base-plate E, secured and held in place by the transverse bolts F, which pass through the frame and are secured by the nuts G. Centrally mounted upon this base-plate is secured by bolts or other suitable means the jack-screw, formed with a broad securing-base J and a threaded sleeve K, in which is secured the threaded stem L. Upon the top of the threaded stem is rotatably mounted the turning collar M, which is used for raising or lowering the screw. Upon this collar is rotatably mounted the axle-claw N, semicircular in shape and adapted to receive the axle of the car-wheels. The frame may be provided with open bearings, as shown in dotted lines, so as to permit of the ready removal of the wheels of the truck.

The jack-screw is of ordinary construction, and an opening O is provided in the base-plate to allow the threaded stem to pass down through the base-plate.

My combined jack and truck may be used in any position; but it is usually placed in a pit under the engine or car, and the screw is raised or lowered, as desired, and the wheels may be readily removed or replaced.

From this description, taken in connection with the drawings, it will be readily seen that I provide a combined jack and truck which is very useful and desirable in removing and replacing car-wheels, which may be handled with ease and despatch, which is strong, and which is very efficient and practical in the use for which it is intended.

I claim—

1. In a combined jack and truck, the combination with a frame formed of two side bars carrying a base-plate, of rollers mounted in the ends of said frame, and a jack-screw centrally mounted on said base-plate.

2. In a combined jack and truck, the combination with a frame composed of two side bars and a base-plate, a pair of rollers, a jack-screw centrally mounted on said base-plate, and an axle-engaging claw on said jack-screw.

3. A combined jack and truck consisting of a frame composed of side arms having downward extensions on each end, a base-plate secured between said arms, transverse bolts passing through the side arms and base-plate for securing them together, rollers journaled in the extensions, a jack-screw centrally mounted on the base-plate and carrying on its upper end an axle-engaging claw, and a hole or opening in the base-plate to allow the passage of the threaded stem of the jack-screw.

In testimony whereof I affix my signature in presence of two witnesses.

OSCAR F. LANDBERG.

Witnesses:
O. P. ODE,
A. DOSTAL.